United States Patent
Gopalakrishnan et al.

(10) Patent No.: US 9,288,364 B1
(45) Date of Patent: Mar. 15, 2016

(54) METHODS AND SYSTEMS FOR ESTIMATING HALF-TONE FREQUENCY OF AN IMAGE

(71) Applicant: XEROX CORPORATION, Norwalk, CT (US)

(72) Inventors: Sainarayanan Gopalakrishnan, Chennai (IN); Rajasekar Kanagasabai, Chennai (IN); Xing Li, Webster, NY (US); Clara Cuciurean-Zapan, Fairport, NY (US); Pravin Jogdand, Ambejogai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/632,105

(22) Filed: Feb. 26, 2015

(51) Int. Cl.
| | |
|---|---|
| *H04N 1/403* | (2006.01) |
| *G06T 7/00* | (2006.01) |
| *G06K 9/46* | (2006.01) |
| *G06K 15/02* | (2006.01) |
| *G06F 3/12* | (2006.01) |

(52) U.S. Cl.
CPC ............... *H04N 1/403* (2013.01); *G06K 9/46* (2013.01); *G06K 15/1822* (2013.01); *G06T 7/00* (2013.01); *G06T 7/0079* (2013.01); *G06F 3/122* (2013.01); *G06F 3/1229* (2013.01); *G06K 2009/4666* (2013.01); *G06T 2207/10004* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,181,829 B1 * | 1/2001 | Clark | ................. | H04N 1/40062 382/224 |
| 6,229,923 B1 * | 5/2001 | Williams | ........... | G06K 9/00456 382/173 |
| 6,347,153 B1 * | 2/2002 | Triplett | ................... | G06T 7/403 382/224 |
| 6,549,658 B1 * | 4/2003 | Schweid | ............ | H04N 1/40062 382/173 |
| 7,239,430 B2 | 7/2007 | Shiau et al. | | |
| 7,365,882 B2 | 4/2008 | Curry et al. | | |
| 7,375,856 B2 | 5/2008 | Curry et al. | | |
| 7,773,776 B2 | 8/2010 | Adachi | | |
| 8,345,310 B2 * | 1/2013 | Adachi | ............. | H04N 1/40062 358/3.06 |
| 9,147,262 B1 * | 9/2015 | Li | ...................... | H04N 1/40018 |
| 2006/0152765 A1 * | 7/2006 | Adachi | ................. | H04N 1/403 358/3.06 |

OTHER PUBLICATIONS

U.S. Appl. No. 14/467,355; Aug. 25, 2014; Methods and Systems for Image Processing; Li et al.

\* cited by examiner

*Primary Examiner* — Scott A Rogers (57) ABSTRACT

The disclosed embodiments illustrate methods and systems for estimating a half-tone frequency of an image. The method includes combining, by one or more processors, a first binary block, obtained from a portion of the image, with one or more second binary blocks to create a third binary block. Each of the one or more second binary blocks is obtained by shifting the first binary block. The method further includes estimating, by the one or more processors, the half-tone frequency of the portion of the image, based on the first binary block and the third binary block.

20 Claims, 6 Drawing Sheets

METHODS AND SYSTEMS FOR ESTIMATING HALF-TONE FREQUENCY OF AN IMAGE

TECHNICAL FIELD

The presently disclosed embodiments are related, in general, to image processing. More particularly, the presently disclosed embodiments are related to methods and systems for estimating a half-tone frequency of an image.

BACKGROUND

With the advancement in computational capabilities of computing devices, various image processing operations, which were earlier confined to high-end computational machines, may be performed on various computing devices such as smart-phones, Personal Digital Assistants (PDAs), tablets, desktop computers, laptops, Multi-Functional Devices (MFDs), scanners, printers, etc. For instance, a computing device may be used to estimate a half-tone frequency of an image during scanning or printing of the image. Generally, the half-tone frequency may be estimated by first identifying various objects in the image, followed by determining the half-tone frequency of such objects. However, such determination may still be a time consuming process, which may require more computational power and higher costs.

SUMMARY

According to embodiments illustrated herein, there is provided a method for estimating a half-tone frequency of an image. The method includes combining, by one or more processors, a first binary block, obtained from a portion of the image, with one or more second binary blocks to create a third binary block. Each of the one or more second binary blocks is obtained by shifting the first binary block. The method further includes estimating, by the one or more processors, the half-tone frequency of the portion of the image, based on the first binary block and the third binary block.

According to embodiments illustrated herein, there is provided a system for estimating a half-tone frequency of an image. The system includes a computing device comprising one or more processors configured to combine a first binary block, obtained from a portion of the image, with one or more second binary blocks to create a third binary block. Each of the one or more second binary blocks is obtained by shifting the first binary block. The one or more processors are further configured to estimate the half-tone frequency of the portion of the image, based on the first binary block and the third binary block.

According to embodiments illustrated herein, there is provided a computer program product for use with a computing device. The computer program product comprises a non-transitory computer readable medium, the non-transitory computer readable medium stores a computer program code for estimating a half-tone frequency of an image. The computer readable program code is executable by one or more processors in the computing device to combine a first binary block, obtained from a portion of the image, with one or more second binary blocks to create a third binary block. Each of the one or more second binary blocks is obtained by shifting the first binary block. The computer readable program code is further executable by the one or more processors to estimate the half-tone frequency of the portion of the image, based on the first binary block and the third binary block.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes a processor/microcontroller and/or any other electronic component, or a device or a system that performs one or more operations according to one or more programming instructions. In an embodiment, the computing device has an associated display that may be utilized for displaying one or more images. Examples of the computing device may include, but are not limited to, a desktop computer, a laptop, a PDA, a mobile device, an MFD, a smartphone, a tablet computer (e.g., iPad®, and Samsung Galaxy Tab®), and the like.

A "Multi-Function Device" (MFD) refers to a computing device that can perform multiple functions. Examples of the functions may include, but are not limited to, printing, scanning, copying, faxing, emailing, and the like. In an embodiment, the MFD includes a scanner and a printer for scanning and printing one or more documents, respectively. In an embodiment, the MFD has communication capabilities that enable the MFD to send/receive data and messages in accordance with one or more communication protocols such as, but not limited to, HTTP, FTP, WebDAV, E-mail, SMB, NFS, and TWAIN.

An "image" refers to an electronic file containing content such as text, pictures, and meta-data information such as, but not limited to, a file-format/type, a compression/encryption scheme usable for compressing/encrypting the content, a creation/access timestamp, and so on. In an embodiment, the image may be represented using one or more color schemes such as but not limited to, RGB (Red-Green-Blue), HSV (Hue-Saturation-Value), YCbCr, Gray Scale, and so on.

An "image object" refers to an entity occupying a pre-defined area within the image. The image object may encompass a set of pixels in the image such that the set of pixels forms one or more image features, such as, but not limited to, one or more lines, one or more edges, one or more contours, one or more ridges, and so on.

A "portion of an image" refers to a region of interest within an image, on which one or more image processing operations are to be performed. In an embodiment, the user may select the portion of the image. In another embodiment, a computing device may identify one or more image objects in the image using one or more image processing techniques and identify the portion as a region including the one or more image objects. In an embodiment, the one or more image objects may have one or more associated image features such as, but not limited to, one or more edges, one or more ridges, one or more contours, and so on. In an embodiment, the computing image object in the portion of the image may be determined by utilizing one or more image analysis techniques known in the art such as, but not limited to, a connected component analysis, or a windowing-based image-feature extraction analysis.

A "block" refers to a set of pixels in the portion of the image. In an embodiment, the portion of the image may include one or more blocks. In an embodiment, the set of blocks may include a predetermined number of pixels. For example, the portion of the image may be divided in the one or more blocks of size 32×32. Thus, total number of pixels included in a block from the one or more blocks will be 1024.

A "sub-block" refers to a set of pixels in a block within the portion of the image. In an embodiment, each block in the portion of the image may be divided into a predetermined number of sub-blocks. For example, the portion of the image includes four 32×32 blocks. Further, each block may include four sub-blocks of the size 16×16.

An "average" refers to any mathematical operation in which multiple data values are caused to be effectively summarized, for any purpose, as a single data value. For example, an average may correspond to, but is not limited to, a mean, a rolling average, a weighted average, a median, a mode, or any result of any applied mathematical or statistical techniques.

A "pixel value" refers to an intensity associated with a particular pixel. In an embodiment, the intensity may be within a pre-determined range based on the type of the image. For example, each pixel of an 8-bit gray scale image may have a pixel value within the range of 0 to 255.

A "measurability criteria" refers to a set of conditions against which a block may be evaluated to determine whether the block should be selected for further processing. In an embodiment, the measurability criteria may correspond to one or more predetermined thresholds. For example, the one or more predetermined thresholds may include, but are not limited to, a threshold for a minimum pixel value, a threshold for a maximum pixel value, and a threshold for a range of pixel values included in the block. In an embodiment, the user may provide the one or more predetermined thresholds as a user-input. Alternatively, the one or more predetermined thresholds may correspond to programmable parameters associated with the processing of the image.

A "measurable block" refers to a block of the portion of the image that satisfies the measurability criteria.

"Half-tone frequency" refers to a frequency of occurrence of individual dots or lines in a representation of a color/gray scale image. In an embodiment, the half-tone frequency of the image may be determined during a scanning or a printing of the image. The half-tone frequency may be measured in terms of Lines per inch (LPI) or Dots per inch (DPI).

A "binary block" refers to a block of pixels in an image with pixel values represented by a single bit value of a binary '1' or a binary '0'.

Figure 1:
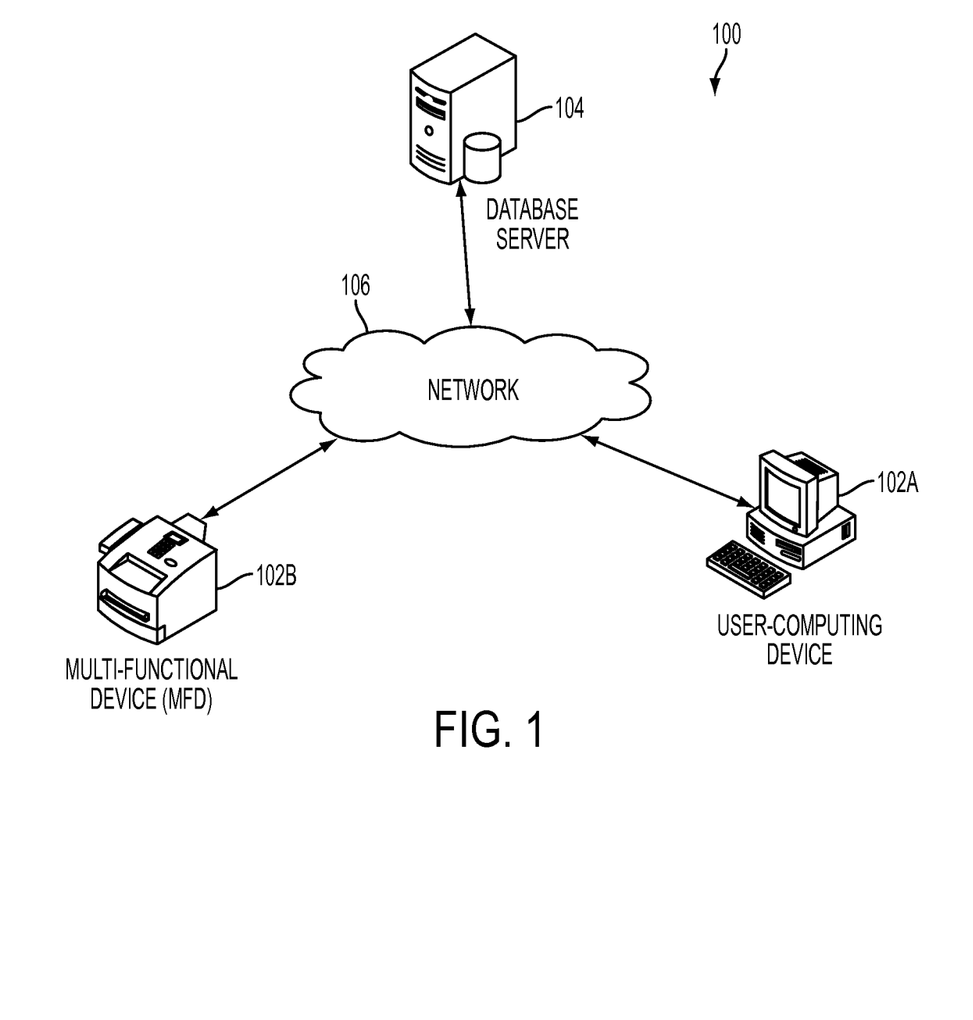
FIG. 1 is a block diagram illustrating a system environment in which various embodiments may be implemented.

FIG. 1 is a block diagram illustrating a system environment 100 in which various embodiments may be implemented. The system environment 100 includes user-computing device 102a, an MFD 102b, a database server 104, and a network 106. Various devices in the system environment 100 (e.g., the user-computing device 102a, the MFD 102b, and the database server 104) may be interconnected over the network 106.

The user-computing device 102a refers to a computing device used by a user. In an embodiment, using the user-computing device 102a, the user may provide inputs for processing an image. For example, the user may provide an input to select a portion of the image for processing. Further, the user may provide inputs corresponding to pre-determined threshold values for a measurability criteria. In an embodiment, the pre-determined threshold values may include, but are not limited to, a threshold for a minimum pixel value, a threshold for a maximum pixel value, and a threshold for a range of pixel values included in a block of the image. In an embodiment, the predetermined threshold values may be used to identify one or more blocks in the image, that may be used to estimate half-tone frequency of the image. The user may provide the inputs using the input devices (e.g., keyboard, computer-mouse, and touch interface) associated with the user-computing device 102a. In an embodiment, the user-computing device 102a may have an associated display that may be utilized for displaying processed image.

In an embodiment, the user-computing device 102a may be also utilized to access the MFD 102b over the network 106. Further, the user may provide various types of inputs, as disclosed above, by accessing the MFD 102b. For example, the user may provide inputs through an interface provided by the MFD 102b.

In an embodiment, the user-computing device 102a may correspond to various types of computing devices, such as, but not limited to, a desktop computer, a laptop, a PDA, a mobile device, a smartphone, a tablet computer (e.g., iPad®, and Samsung Galaxy Tab®), and the like.

The MFD 102b refers to a computing device that may process the image. In an embodiment, the processing of the image may include estimation of a half-tone frequency of the portion of the image. In an embodiment, the MFD 102b may identify one or more portions in the image, where each of the one or more portions may include at least one object. Thereafter, the MFD 102b may divide each of the one or more portions in a set of blocks. Further, each block in the set of blocks may be divided into a set of sub-blocks. Thereafter, the MFD 102b may determine whether a block, from the set of blocks, is a measurable block based on the measurability criteria. As described above, in an embodiment, the pre-determined threshold values for the measurability criteria may be provided by the user of the user-computing device 102a. In another embodiment, a manufacturer of the MFD 102b may preconfigure the pre-determined threshold values for the measurability criteria and store the pre-determined threshold values in a memory of the MFD 102b. In an embodiment, the determination of the measurability criteria has been described in conjunction FIG. 3.

Further, the MFD 102b may convert the identified measurable blocks into one or more binary blocks. For a first binary block in the one or more binary blocks, the MFD 102b obtains one or more second binary blocks by performing one or more shifting operation on the first binary block. In an embodiment, examples of the one or more shifting operations may include, but are not limited to, a left shift operation, a right shift operation, a top shift operation, or a bottom shift operation. Thereafter, the MFD 102b may combine the first binary block with the one or more second binary blocks to obtain a third binary block. Further, the MFD 102b may estimate the half-tone frequency of the identified measurable block (which is converted to the first binary block) based on the first binary block in the portion of the image, and the third binary block (obtained by combining the one or more second binary blocks and the first binary block). In an embodiment, the half-tone frequency of the measurable block may be estimated based on a count of white pixels in said first binary block and a count of white pixels in said third binary block. Further, in an embodiment, the half-tone frequency of the portion of the image may be estimated based on a half-tone frequency determined for a pre-determined number of measurable blocks having a same value. Alternatively, the half-tone frequency of the portion of the image may be estimated based on an average of the half-tone frequency estimated for a pre-determined number of measurable blocks, in the portion of the image. An embodiment of the processing of the image to estimate the half-tone frequency of the portion of the image has been explained in conjunction with FIG. 3.

In an embodiment, the MFD 102b may include various types of computing devices, such as, but not limited to, printers, scanners, copiers, fax-machines, desktop computers, laptops, PDAs, smartphones, mobile devices, tablet computers, and the like.

A person having ordinary skill in the art would understand that the scope of the disclosure is not limited to the MFD 102b for processing the image. In an embodiment, the user-computing device 102a may process the image, without departing from the scope of the disclosure. For example, the user-computing device 102a (e.g., a mobile phone) may process the image to determine half-tone frequencies associated with different portions of the image (e.g., selected by user), and subsequently the user-computing device 102a may share the determined half-tone frequencies with the MFD 102b for further processing (e.g., printing).

The database server 104 refers to a computing device that may store the image. In an embodiment, the database server 104 may store various types of metadata information associated with the image. Examples of the metadata information may include, but is not limited to, a file-format/type, a compression/encryption scheme usable for compressing/encrypting the content, a creation/access timestamp, and so on. In an embodiment, the database server 104 may store pre-determined values usable for the image processing operations. For example, the database server 104 may store one or more lookup tables that may be used to determine the half-tone frequency of the image. The one or more lookup tables have been described later in conjunction with FIG. 3. Further, the database server 104 may store the one or more predetermined thresholds corresponding to the measurability criteria. In an embodiment, the database server 104 may store a mapping between different users and the respective predetermined threshold values provided by the users. In an embodiment, the database server 104 may receive a query from the user-computing device 102a and/or the MFD 102b for retrieving various types of information stored in the database server 104. For querying the database server 104, one or more querying languages may be utilized, such as, but not limited to, SQL, QUEL, DMX and so forth. Further, the database server 104 may be realized through various technologies such as, but not limited to, Microsoft® SQL Server, Oracle®, IBM DB2®, Microsoft Access®, PostgreSQL®, MySQL® and SQLite®, and the like. In an embodiment, the database server 104 may connect to the user-computing device 102a and/or MFD 102b, using one or more protocols such as, but not limited to, ODBC protocol and JDBC protocol.

It will be apparent to a person skilled in the art that the functionalities of the database server 104 may be incorporated into the MFD 102b, without departing from the scope of the disclosure. In such a scenario, various types of information, as disclosed above, may be stored in the MFD 102b.

The network 106 corresponds to a medium through which content and messages flow between various devices of the system environment 100 (e.g., the user-computing device 102a, the MFD 102b, and the database server 104). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

Figure 2:
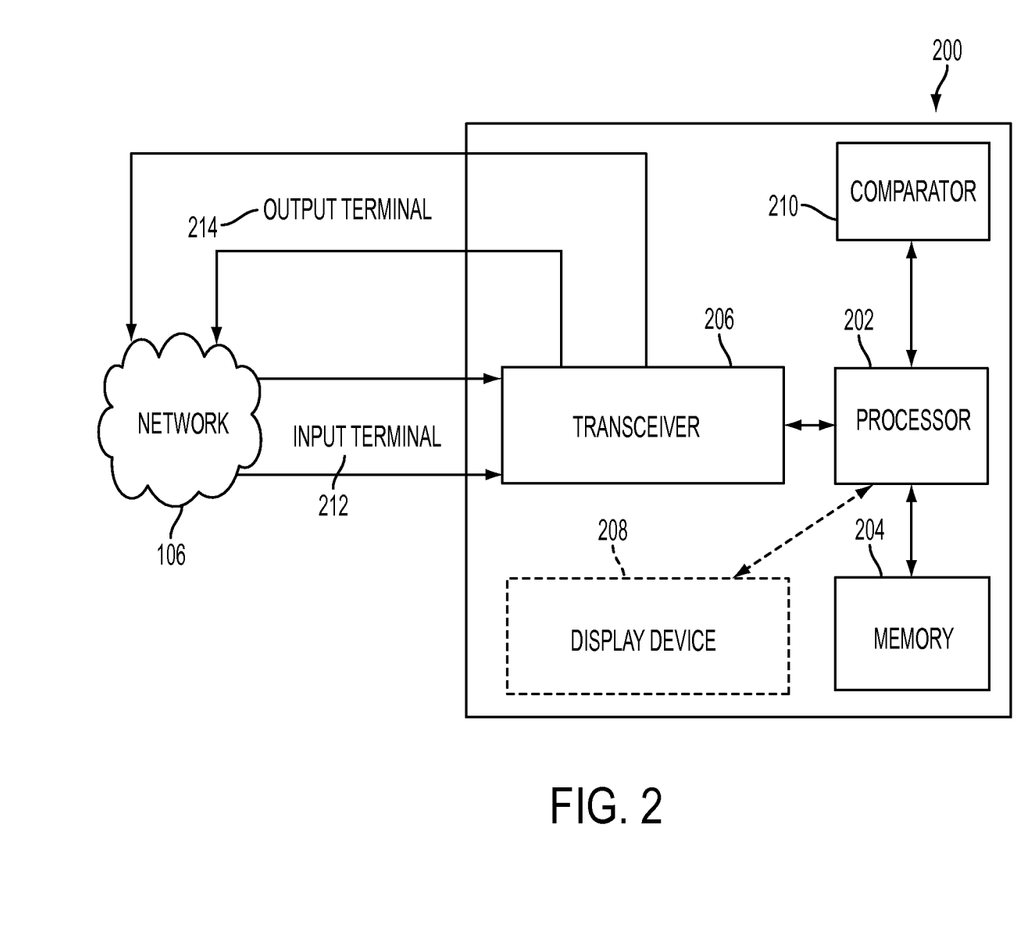
FIG. 2 is a block diagram illustrating a computing device, in accordance with at least one embodiment.

FIG. 2 is a block diagram illustrating a computing device 200, in accordance with at least one embodiment. The computing device 200 may correspond to at least one of the user-computing device 102a or the MFD 102b. In an embodiment, the computing device 200 includes a processor 202, a memory 204, a transceiver 206, a display 208, and a comparator 210. The transceiver 206 is coupled to the network 106 through an input terminal 212 and an output terminal 214.

The processor 202 is coupled to the memory 204, the transceiver 206, and the display 208. The processor 202 includes suitable logic, circuitry, and/or interfaces that are operable to execute one or more instructions stored in the memory 204 to perform pre-determined operation. The memory 204 may be operable to store the one or more instructions. The processor 202 may be implemented using one or more processor technologies known in the art. Examples of the processor 202 include, but are not limited to, an ×86 processor, a RISC processor, an ASIC processor, a CISC processor, or any other processor.

A person skilled in the art would appreciate that the scope of the disclosure should not be limited to the computing device 200 including a single processor. The computing device 200 may include more than one processors, which may operate in parallel and perform the one or more predetermined operations. Further, in an embodiment, the processor 202 may be capable of performing more than one operations in parallel. For example, the processor 202 may be a multi-threaded processor, which may execute more than one threads/processes concurrently. Each such thread/process may be executed to perform a predetermined operation.

The memory 204 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the memory 204 includes the one or more instructions that are executable by the processor 202 to perform specific operations. It will be apparent to a person having ordinary skill in the art that the one or more instructions stored in the memory 204 enables the hardware of the computing device 200 to perform the predetermined operation.

The transceiver 206 transmits and receives messages and data to/from various components of the system environment 100 over the network 106. In an embodiment, the transceiver 206 is coupled to the input terminal 212 and the output terminal 214 through which the transceiver 206 may receive and transmit data/messages, respectively. Examples of the transceiver 206 may include, but are not limited to, an antenna, an Ethernet port, a USB port, or any other port that can be configured to receive and transmit data. The transceiver 206 transmits and receives data/messages in accordance with the various communication protocols such as, TCP/IP, UDP, and 2G, 3G, or 4G communication protocols.

The display 208 facilitates the user to view information presented on the computing device 200. For example, the user may view the images on the display 208. The display 208 may be realized through several known technologies, such as Cathode Ray Tube (CRT) based display, Liquid Crystal Display (LCD), Light Emitting Diode (LED) based display, Organic LED based display, and Retina Display® technology. In an embodiment, the display 208 can be a touch screen that is operable to receive a user-input.

The comparator 210 is configured to compare at least two input signals to generate an output signal. In an embodiment, the output signal may correspond to either '1' or '0'. In an embodiment, the comparator 210 may generate output '1' if the value of a first signal (from the at least two signals) is greater than a value of the second signal (from the at least two signals). Similarly, the comparator 210 may generate an output '0' if the value of the first signal is less than the value of the second signal. In an embodiment, the comparator 210 may be realized through either software technologies or hardware technologies known in the art. Though, the comparator 210 is depicted as independent from the processor 202 in FIG. 2, a person skilled in the art would appreciate that the comparator 210 may be implemented within the processor 202 without departing from the scope of the disclosure.

Figure 3:
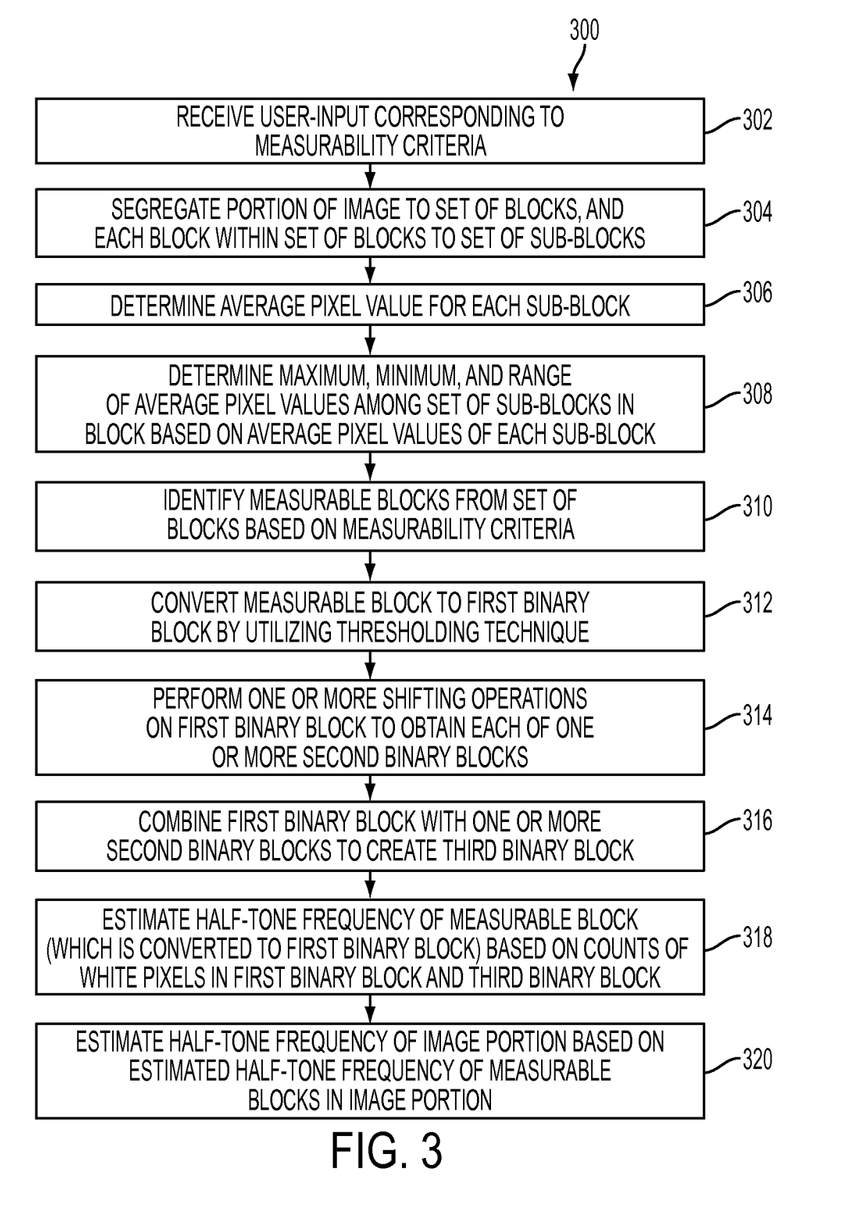
FIG. 3 is a flowchart illustrating a method for processing an image to estimate a half-tone frequency of a portion of the image, in accordance with at least one embodiment.

An embodiment of the operation of the computing device 200 for processing of the image to determine the half-tone frequency of the portion of the image has been described in conjunction with FIG. 3.

For the purpose of the ongoing description the computing device 200 has been considered as the MFD 102b, however, a person skilled in the art would appreciate that the scope of the disclosure is not restricted to the computing device 200 as the MFD 102b. In an embodiment, the computing device 200 may be realized as the user-computing device 102a.

FIG. 3 is a flowchart 300 illustrating a method for processing the image to estimate the half-tone frequency of the portion of the image, in accordance with at least one embodiment. The flowchart 300 is described in conjunction with FIG. 1 and FIG. 2.

At step 302, a user-input corresponding to the measurability criteria is received. In an embodiment, the processor 202 is configured to receive the user-input corresponding to the measurability criteria. In an embodiment, a user of the user-computing device 102a may provide the user-input through a user-interface presented on the user-computing device 102a. In an embodiment, the user-input may pertain to the measurability criteria, which may be utilized by the processor 202 to check whether a block has to be processed further. For example, the user-input may include the one or more predetermined threshold values corresponding to the measurability criteria such as, but not limited to, a threshold for a maximum average pixel value, a threshold for a minimum average pixel value, and a threshold for a range of average pixel values. Table 1 illustrates an example of values of the one or more predetermined threshold values:

TABLE 1

Example of values of the one or more predetermined threshold values

| Predetermined Threshold value | Value |
|---|---|
| (Minimum average pixel value) L | 35 |
| (Maximum average pixel value) H | 235 |
| (Range of average pixel value) R | 145 |

As is evident from Table 1, a value of 35 may be specified for the predetermined threshold "minimum average pixel value" (denoted by "L") for a block being evaluated for measurability. Similarly, values 235 and 145 may be specified for the predetermined thresholds "minimum average pixel value" and "range of average pixel values" (denoted by "H" and "R", respectively). The evaluation of the blocks for measurability has been further elaborated in conjunction with step 310.

A person skilled in the art would appreciate that the scope of the disclosure is not limited to receiving the pre-determined threshold values from the user of the user-computing device 102a as the user-input. In an embodiment, a manufacturer of the MFD 102b may preconfigure the pre-determined threshold values for the measurability criteria and store the pre-determined threshold values in a memory of the MFD 102b.

Further, in an embodiment, the processor 202 may receive the image from the user-computing device 102a. The processor 202 may also receive a selection of the portion of the image from the user-computing device 102a. For example, through a user-interface of the user-computing device 102a, the user may select a region in the image as the portion of the image to be processed. Alternatively, the user may select one or more objects of interest from one or more image objects present in the image as the portion of the image. In another embodiment, the processor 202 may automatically determine the portion of the image, without explicit user-input. In such a scenario, the processor 202 may utilize one or more image processing techniques to identify the one or more image objects in the image. Thereafter, the processor 202 may identify the portion of the image as a region encompassing the one or more image objects. Examples of the one or more image processing techniques used for identifying the one or more image objects include, but are not limited to, a connected component analysis, a windowing based image object extraction, and so on.

At step 304, the portion of the image is divided into a set of blocks. In an embodiment, each block in the set of blocks is further divided into a set of sub-blocks. The processor 202 is configured to divide the portion of the image into the set of blocks and the set of blocks further into the set of sub-blocks.

For example, the processor 202 may divide the portion of the image into N×N blocks (N>=1). Further, the processor 202 may divide each of the N×N blocks, into M×M sub-blocks (M<=N). In an embodiment, the values of M and N may be provided the user. In an alternate embodiment, the values of M and N are predefined. Further illustrations of the division of the portion of the image into different blocks and sub-blocks has been discussed in conjunction with the FIG. 4.

A person skilled in the art would appreciate that the scope of the disclosure should not be limited to dividing the portion of the image into square blocks (e.g., N×N blocks) and square sub-blocks (M×M sub-blocks). In an embodiment, the portion of the image may be divided into rectangular blocks (e.g., N1×N2 blocks, where N1≠N2) and rectangular sub-blocks (e.g., M1×M2 sub-blocks, where M1≠M2, M1<=N1, M2<=N2). Alternatively, the portion of the image may be divided into rectangular blocks and square sub-blocks.

At step 306, an average pixel value is determined for each sub-block within a block in the set of blocks. In an embodiment, the processor 202 is configured to determine the average pixel value for each of the one or more sub-blocks based on the pixels encompassed in the respective sub-block. For instance, the image is divided into the N×N blocks (N>=1) and each of the N×N blocks is further divided into the M×M sub-blocks (M<=N). If a sub-block encompasses 'X' pixels, then the processor 202 may determine the average pixel value of the sub-block as an average of the pixel values of the individual 'X' pixels in the sub-block. In an embodiment, the processor 202 may utilize the following equation to determine the average pixel value of each sub-block:

$$Avg(SB_i) = \frac{\sum_{j=1}^{j=X} P_{ij}}{X} \quad (1)$$

where,

Avg ($SB_i$): Average pixel value of $i^{th}$ sub-block, $SB_i$, $P_{ij}$: Pixel value of $j^{th}$ pixel within the $i^{th}$ sub-block, $SB_i$, and X: Number of pixels within the $i^{th}$ sub-block, $SB_i$.

In an embodiment, the pixel value of each pixel may correspond to the intensity value of the particular pixel. A person skilled in the art would understand that the scope of the disclosure is not limited to determining the average pixel value using equation 1. Any mathematical operation, in which multiple data values are manipulated to obtain an aggregate value representative of the multiple data values, may be used for determining the average pixel value, without departing from the spirit of the disclosure. For example, the term average may correspond to, but is not limited to, a mean, a rolling average, a weighted average, a median, a mode, and the like. Further, a person skilled in the art would appreciate that the one or more mathematical operations, as discussed above, may be applied to the values of the pixels encompassed within the sub-block in any color space known in the art such as, but not limited to, RGB (Red-Green-Blue), HSV (Hue-Saturation-Value), $YC_bC_r$, Gray Scale, and so on.

At step 308, a minimum average pixel value, a maximum average pixel value, and a range of average pixel values, among the set of sub-blocks within each block are determined based on the average pixel values of each sub-block. In an embodiment, the processor 202 is configured to determine the minimum average pixel value, the maximum average pixel value, and the range of average pixel values.

For example, a block $B_i$ in the portion of the image contains four sub-blocks $SB_1$, $SB_2$, $SB_3$, and $SB_4$. In such a scenario, the processor 202 may determine the minimum average pixel value for the block $B_i$ as:

$$Min(B_i) = Min\{Avg(SB_1), Avg(SB_2), Avg(SB_3), Avg(SB_4)\} \quad (2)$$

Where, Min ($B_i$): Minimum average pixel value for the block $B_i$,

Avg ($SB_j$): Average pixel value of $j^{th}$ sub-block (where j=1-4), which may be determined using equation 1.

Similarly, the processor 202 may determine the maximum average pixel value for the block $B_i$ as:

$$Max(B_i) = Max\{Avg(SB_1), Avg(SB_2), Avg(SB_3), Avg(SB_4)\} \quad (3)$$

where,

Max ($B_i$): Maximum average pixel value for the block $B_i$, and

Avg ($SB_j$): Average pixel value of $j^{th}$ sub-block (where j=1-4), which may be determined using equation 1.

In an embodiment, the processor 202 may utilize the comparator 210 to compare the average pixel values of the sub-blocks and determine the minimum average pixel value and the maximum average pixel value for the block, based on the comparison. For instance, in the above example, the processor 202 may utilize the comparator 210 to compare the values Avg ($SB_1$), Avg ($SB_2$), Avg ($SB_3$), and Avg ($SB_4$). Thereafter, the processor 202 may determine the values Min ($B_i$) and Max ($B_i$) as the minimum and maximum of the four values (i.e., Avg ($SB_1$), Avg ($SB_2$), Avg ($SB_3$), and Avg ($SB_4$)), respectively.

Further, the processor 202 may determine the range of average pixel values for the block $B_i$ as:

$$Range(B_i) = Max(B_i) - Min(B_i) \quad (4)$$

where,

Range ($B_i$): Range of average pixel values for the block $B_i$,

Max ($B_i$): Maximum average pixel value for the block $B_i$, and

Min ($B_i$): Minimum average pixel value for the block $B_i$.

At step 310, one or more measurable blocks are identified from the set of blocks based on the measurability criteria. In an embodiment, the processor 202 is configured to evaluate each block on the measurability criteria. Thereafter, based on the evaluation of each block on the measurability criteria, the processor 202 may identify one or more blocks from the set of blocks as measurable blocks. In an embodiment, a block being checked on the measurability criteria is evaluated based on the one or more predetermined threshold values and a set of predetermined conditions associated with the measurability criteria. In an embodiment, the set of pre-determined conditions may be specified by the user through the user-interface of the user-computing device 102a. Alternatively, the processor 202 may determine the set of pre-determined conditions heuristically. In an embodiment, the set of pre-determined conditions for the evaluation of a block on the measurability criteria may be represented by following set of equations:

$$Min(B_i) \geq L \quad (5)$$

$$Max(B_i) \leq H \quad (6)$$

$$Range(B_i) \leq R \quad (7)$$

where the values for Min ($B_i$), Max ($B_i$), and Range ($B_i$) may be determined using the equations 2, 3, and 4, respectively, and the values for the one or more predetermined thresholds L, H, and R may be provided by the user, as discussed above.

In an embodiment, processor 202 may utilize the comparator 210 to perform the comparisons of the set of predetermined conditions illustrated in the equations 5, 6, and 7. Further, the processor 202 may identify the blocks that satisfy the set of predetermined conditions illustrated in the equations 5, 6, and 7, as measurable blocks.

After identifying the one or more blocks, from the set of blocks, as the measurable blocks, in an embodiment, the processor 202 may tag/label the one or more identified blocks as measurable blocks. The one or more identified measurable blocks may be used for determining the half-tone frequency of the portion of the image.

At step 312, a measurable block from the one or more blocks is converted to the first binary block. In an embodiment, the processor 202 is configured to convert a measurable block, from the one or more identified measurable blocks, to the first binary block using a thresholding technique (e.g., Otsu's method). To that end, in an embodiment, the processor 202 may generate a histogram of the pixel values of the pixels included in the measurable block. Thereafter, the processor 202 may determine one or more valleys and one or more peaks of the histogram. Further, the processor 202 may select a threshold value as a valley point lying between two peak points in the histogram. For example, the processor 202 may select such a valley point from the histogram, which optimally separates the histogram into two parts based on a heuristic. For instance, the threshold value may be selected as the valley point that separates the histogram into equal areas (or approximately equal area). Post selecting the threshold value, the processor 202 may utilize the threshold value to convert the measurable block to the first binary block, i.e., the measurable block is binarized based on the threshold value. For example, if the threshold value of 128, all pixels in the measurable block with a pixel intensity value of 128 or more will be assigned a binary value of '1' and the rest of the pixels (i.e., pixels with a pixel intensity value of 127 or less) will be assigned a binary value of '0'.

A person skilled in the art would appreciate that the scope of the disclosure should not be limited to the conversion of the measurable block to the first binary block, as disclosed above. The measurable block may be converted to the first binary block using any image processing technique known in the art without departing from the spirit of the disclosure.

Further, a person skilled in the art would appreciate that each measurable block may be converted into a separate first binary block. Steps 314 through 318 have been explained with reference to a single first binary block, converted from a single measurable block. However, each such first binary block generated from a respective measurable block may be processed in a manner similar to that discussed in the steps 314 through 318.

At step 314, the one or more shifting operations are performed on the first binary block to obtain the one or more second binary blocks. In an embodiment, the processor 202 is configured to obtain the one or more second binary blocks by performing the one or more shifting operations on the first binary block. In an embodiment, examples of the one or more shifting operations include, but are not limited to, a left shift operation, a right shift operation, a top shift operation, or a bottom shift operation. In an embodiment, the processor 202 may use one or more shift registers to perform the one or more shifting operations. The processor 202 may fill the one or more shift registers with the pixel values of the first binary block. In an embodiment, each shift register may accommodate a single row or a single column of pixel values from the first binary block. For example, the first binary block includes four rows and three columns of pixels. In such a scenario, the processor 202 may use four shift registers of three bits each, where each shift register accommodates a single row of pixel values of the first binary block. Alternatively, the processor 202 may use three shift registers of four bits each, where each shift register accommodates a single column of pixel values of the first binary block.

Figure 5A:
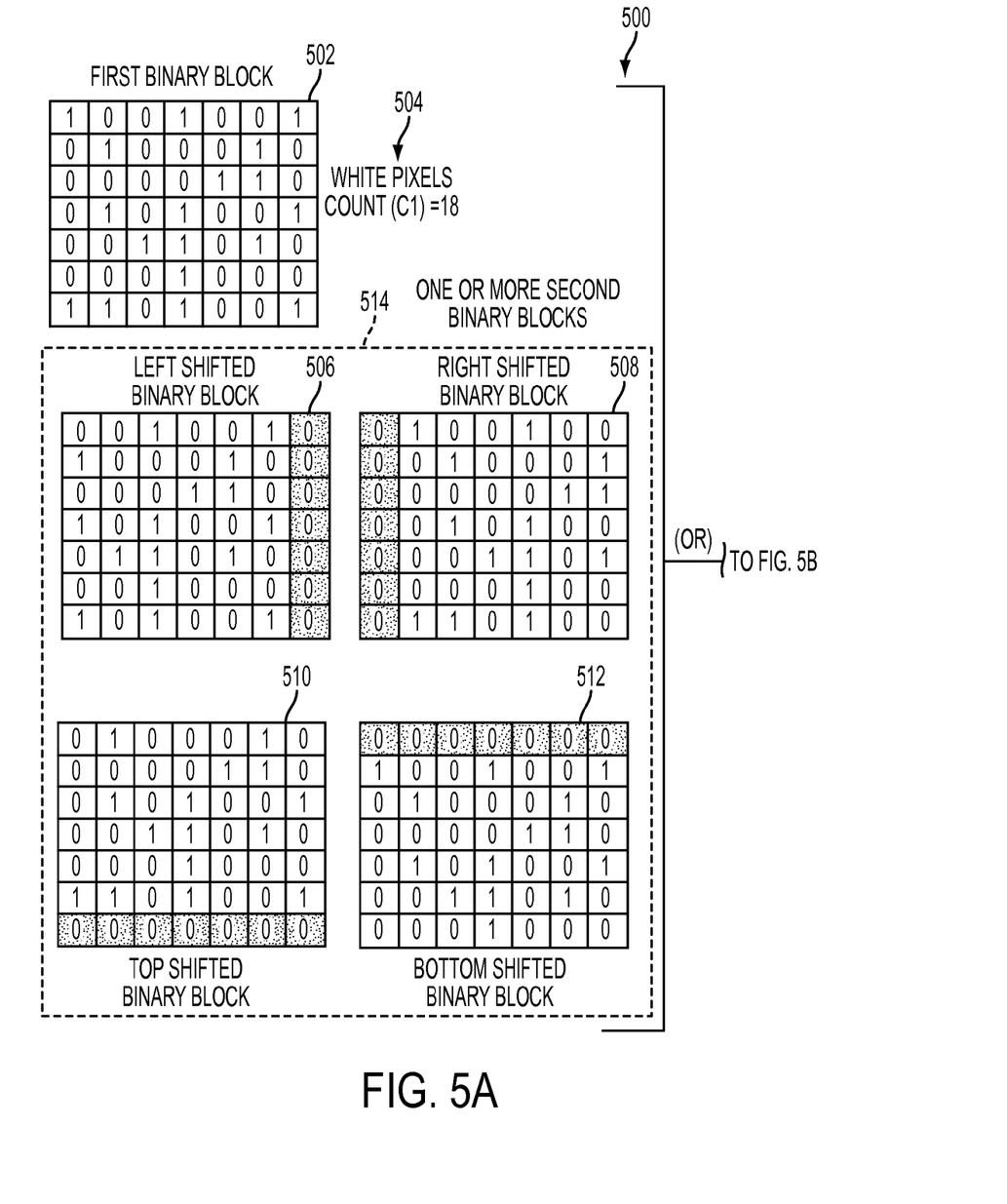
FIGS. 5A and 5B illustrate a block diagram for processing an image to determine a half-tone frequency of a portion of the image, in accordance with at least one embodiment.

Thereafter, the processor 202 may perform a shifting operation on each of the one or more shift registers. Further, the processor 202 may create a second binary block (of the same dimensions as the first binary block) based on shifting. For example, if the left shift operation is performed, each bit in the one or more shift registers is shifted to the left of the original position of the bit. The bits, originally in the left most column of the one or more shift registers, are discarded. Further, the bits in the right most column of the one or more shift registers are filled with zeroes (or ones). The binary block so obtained after performing the left shift operation on the first binary block is considered as one of the second binary blocks. Similarly, the processor 202 may create the other second binary blocks by performing other shifting operations (e.g., a right shift operation, a top shift operation, a bottom shift operation) on the one or more shift registers. For example, for a first binary block F, the processor 202 creates a second binary block B1 by performing a left shift operation on the first binary block F. Further, the processor 202 creates second binary blocks B2, B3, and B4 by performing a right shift, a top shift, and a bottom shift operation, respectively, on the first binary block F. An example of the creation of the one or more second binary blocks from the first binary block has been explained in conjunction with FIG. 5.

A person skilled in the art would appreciate that the scope of the disclosure is not limited to the number and the type of shifting operations performed on the first binary block to obtain the one or more second binary blocks. Further, any number of bits may be shifted in each shifting operation without departing from the scope of the disclosure. In addition, the scope of the disclosure is not limited to performing the one or more shifting operations using one or more shift registers. Any hardware/software may be used to perform the one or more shifting operations without departing from the spirit of the disclosure.

At step 316, the first binary block is combined with the one or more second binary blocks to obtain the third binary block. In an embodiment, the processor 202 is configured to obtain the third binary block by combining the first binary block with the one or more second binary blocks. In an embodiment, the processor 202 may use one or more logical operators such as, a logical OR, a logical AND, a logical XOR, or a logical NOR, to combine the first binary block with the one or more second binary blocks and generate the third binary block. An example of the generation of the third binary block by combining the first and the one or more second binary blocks has been explained in conjunction with FIG. 5.

A person skilled in the art would appreciate that the scope of the disclosure is not limited to combining the first and the one or more second binary blocks, as disclosed above. Any logical operator may be used to combine the first and the one or more second binary blocks. Further, any hardware/software may be used to perform such logical operation.

At step 318, the half-tone frequency of the measurable block corresponding to the first binary block is estimated. In an embodiment, the processor 202 is configured to estimate the half-tone frequency of the measurable block. In an embodiment, the processor 202 may determine the half-tone frequency of the measurable block based on a count of white pixels in the first binary block and a count of pixels in the third binary block. As discussed, the database server 104 may store a lookup table representing a relationship between the count of white pixels in the first binary block, the count of white pixels in the third binary block, and a corresponding half-tone frequency estimation of the measurable block. In an embodiment, the processor 202 may extract the lookup table from the database server 104, and store the lookup table in the memory 204. Thereafter, the processor 202 may determine the count of the white pixels in the first binary block and the count of the white pixels in the third binary block. Further, the processor 202 may refer the lookup table to estimate the half-tone frequency of the measurable block. The following table illustrates an example of the lookup table:

TABLE 2

An example of the lookup table

| Ratio R = W3/W1 | Estimated half-tone frequency |
|---|---|
| <1.6 | 85 LPI (color) |
| <2 | 100 LPI (gray) |
| <1.8 and >1.6 | 100 LPI (color) |
| <3 and >2 | 133 LPI (gray) |
| <1.9 and >1.8 | 133 LPI (color) |
| >3.5 | 150 LPI (gray) |
| <2 and >1.9 | 150 LPI (color) |
| >2 | 175 LPI (color) |

The Table 2 illustrates an example of the lookup table for estimation of the half-tone frequency of the measurable block based on a ratio (R) of the count of pixels in the third binary block (W3) and the count of pixels in the first binary block (W1), i.e., R=W3/W1. For instance, referring to Table 2, the half-tone frequency of the measurable block may be approximately 85 lines per inch (LPI) in color when the ratio, R, is less than 1.6. Similarly, the Table 2 illustrates that the estimated value of the half-tone frequency of the measurable block may be approximately 100 LPI in gray scale, when the value of the ratio, R, is less than 2, and so on. Thus, to estimate the half-tone frequency of the measurable block, the processor 202 may determine the ratio, R, of the count of white pixels in the third binary block (W3) to the count of pixels in the first binary block (W1). Thereafter, the processor 202 may refer the lookup table and determine the half-tone frequency of the measurable block as the value corresponding to the calculated ratio, R.

A person skilled in the art would appreciate that the example of the lookup table is for illustrative purpose only and should not be construed to limit the scope of the disclosure. Further, the lookup table may be generated using any technique or heuristic without departing from the scope of the disclosure. In an embodiment, the lookup table may be provided by the user, as a user-input, through the user-interface of the user-computing device 102a.

At step 320, the half-tone frequency of the portion of the image is estimated. In an embodiment, the processor 202 is configured to estimate the half-tone frequency of the portion of the image based on a half-tone frequency estimated for measurable blocks in the portion. In an embodiment, the processor 202 may estimate the half-tone frequency of the portion of the image as an average of the half-tone frequency estimated for a predetermined number of measurable blocks in the portion of the image. In an embodiment, the predetermined number may be a number specified by the user as a user-input. For instance, if the user specifies the predetermined number as three, the processor 202 may estimate the half-tone frequency of the portion of the image as an average of the half-tone frequency of any three measurable blocks in the portion of the image. Alternatively, the predetermined number may be the number of measurable blocks present in the portion of the image. Thus, in this scenario, the processor 202 may estimate the half-tone frequency of the portion of the image as an average of the half-tone frequency estimated for each measurable block in the portion of the image. For example, there are four measurable blocks present in the portion of the image. The processor 202 estimates the half-tone frequency of the four measurable blocks as 100 LPI, 120 LPI, 80 LPI, and 140 LPI. Thereafter, the processor 202 determines the half-tone frequency of the portion of the image as 110 LPI (i.e., (100+120+80+140)/4). A person skilled in the art would appreciate that any known statistical technique may be utilized to determine the half-tone frequency of the portion of the image based on the estimated half-tone frequencies of the predetermined number of measurable blocks. For example, as discussed above, the half-tone frequency of the portion of the image may be determined using one or more statistical techniques such as, but not limited to, a mean, a rolling average, a weighted average, a median, a mode, and the like.

In another embodiment, the processor 202 may determine the half-tone frequency of the portion of image based on the half-tone frequency estimated for a predetermined number of consecutive measurable blocks, in the portion of the image, having a same value (or an approximately same value). In an embodiment, a pair of consecutive measurable blocks refers to two measurable blocks, which do not have any measurable block lying between them, either vertically or horizontally, in the portion of the image. For example, three measurable blocks lie one after the other (either vertically or horizontally) in the portion of the image and thus are consecutive. If the half-tone frequency determined for each of the three consecutive measurable blocks is estimated as 100 LPI, the processor 202 may estimate the half-tone frequency of the portion of the image as 100 LPI, considering the predetermined number as three. In an embodiment, the user may specify the predetermined number as a user-input.

In an embodiment, the identification of measurable blocks (refer to step 310) and the estimation of the half-tone frequency of the measurable blocks (refer to step 318) may be parallelized. Thus, a first processor may evaluate the measurability criteria on a first set of blocks that are within a first portion of the image, while a second processor may estimate the half-tone frequency of the measurable blocks identified in a second portion of the image. In this way, the time consumed for determining the half-tone frequency for the complete image may be reduced. Further, a person skilled in the art would appreciate that the parallelization may be performed using any technique known in the art without departing from the scope of the disclosure.

Figure 4:
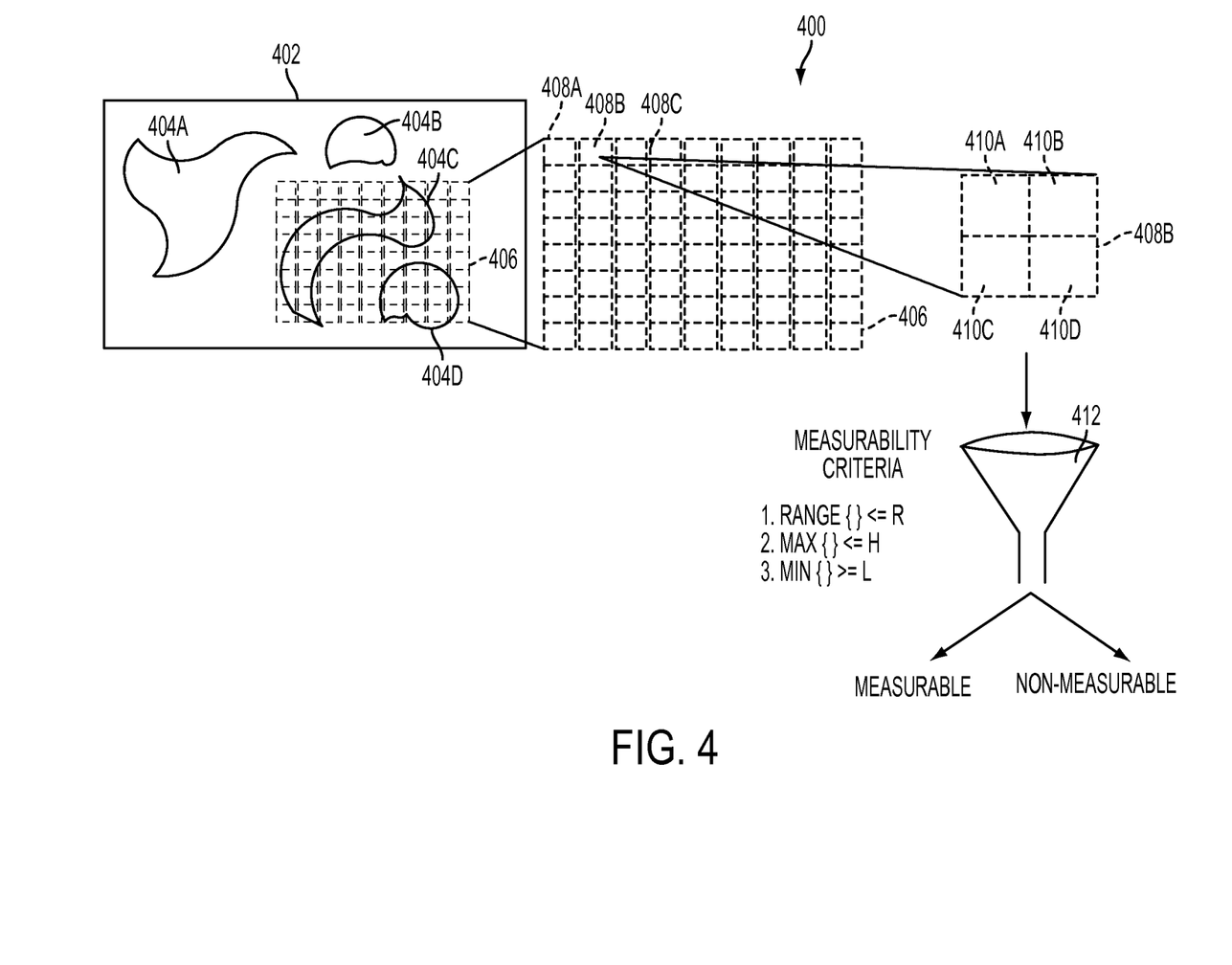
FIG. 4 is a flow diagram illustrating a method for identifying measurable blocks in a portion of an image, in accordance with at least one embodiment.

FIG. 4 is a flow diagram 400 illustrating a method for identifying the measurable blocks in the portion of the image, in accordance with at least one embodiment. FIG. 4 is described in conjunction with FIG. 3.

As shown in FIG. 4, an image that is to be processed has been depicted by 402. The image 402 includes various image objects such as 404A, 404B, 404C, and 404D. The image objects (e.g., 404A, 404B, 404C, and 404D) may be identified using one or more image processing techniques such as, but not limited to, a connected component analysis or a windowing-based feature extraction. In an embodiment, the user may select a portion 406 in the image for further processing. The portion 406, selected by the user, may include one or more image objects. For instance, as shown in FIG. 4, the user selects the portion 406 that includes two objects 400c and 404d. Further, as discussed in step 302, the user may provide an input including the one or more predetermined threshold values (e.g., R, L, and H) associated with the measurability criteria.

Further, the processor 202 may divide the portion of the image 406 into a set of blocks (as discussed in step 304). For instance, as shown in FIG. 4, the set of blocks includes 72 blocks including a block 408A, a block 408B, a block 408C, and so on. Further, the processor 202 divides each block in the set of blocks 406 into a set of sub-blocks. For example, the block 408B is divided into four sub-blocks including a sub-block 410A, a sub-block 410B, a sub-block 410C, and a sub-block 410D.

As explained in conjunction with FIG. 3, for each of the sub-blocks (i.e., the sub-block 410A, the sub-block 410B, the sub-block 410C, and the sub-block 410D), the processor 202 determines an average pixel value based on the pixel values of the pixels encompassed in each of the sub-blocks (as discussed in step 306). For example, the block 408B (and each of the blocks in the portion of the image such as 408A, 408C, and so on) is of the dimension 32×32 pixels. Each sub-block within the block 408B (i.e., 410A, 410B, 410C, and 410D) would be of the dimension 16×16 pixels. Thus, to evaluate the block 408B for measurability, an average pixel value of each sub-block (410A, 410B, 410C, and 410D) is determined. For instance, an average of the 256 pixels within the sub-block 410A is determined as the average pixel value for the sub-block 410A, and so on for the rest of the blocks. As explained earlier, the processor 202 may use any known statistical technique to determine the average without departing from the scope of the disclosure. For instance, the average pixel values of the sub-blocks 410A, 410B, 410C, and 410D are determined as Avg ($SB_{410A}$), Avg ($SB_{410B}$), Avg ($SB_{410C}$), and Avg ($SB_{410D}$), respectively, using equation 1.

Thereafter, the processor 202 may determine a minimum average pixel value, a maximum average pixel value, and a range of pixel values for the block 408B (as discussed in step 308). For instance, for the block 408B, the minimum average pixel value, the maximum average pixel value, and the range of pixel values are determined as Min($B_{408B}$), Max($B_{408B}$), and Range($B_{408B}$), respectively, using equations 2, 3, and 4, respectively, based on the values of Avg($SB_{410A}$), Avg ($SB_{410B}$), Avg($SB_{410C}$), and Avg($SB_{410D}$). Thereafter, the processor 202 may evaluate the block 408B on the measurability criteria (denoted by 412) based on the values of Range ($B_{408B}$), Max ($B_{408B}$), and Min ($B_{408B}$). For the block 408B to be measurable, Range($B_{408B}$) and Max($B_{408B}$) should be less than or equal to the predetermined thresholds 'R' and 'H' respectively, and Min($B_{408B}$) should be greater than or equal to the predetermined threshold "L" (as discussed in step 310). As already explained, the one or more predetermined thresholds 'R', 'H', and "L" may either be provided as user-inputs or may correspond to programmable parameters. Further, the measurability criteria may be modifiable by a user for processing of different portions of the image 402. Thus, two different portions of the same image or two portions of two different images may have a different measurability criteria specified by the user.

Figure 5B:
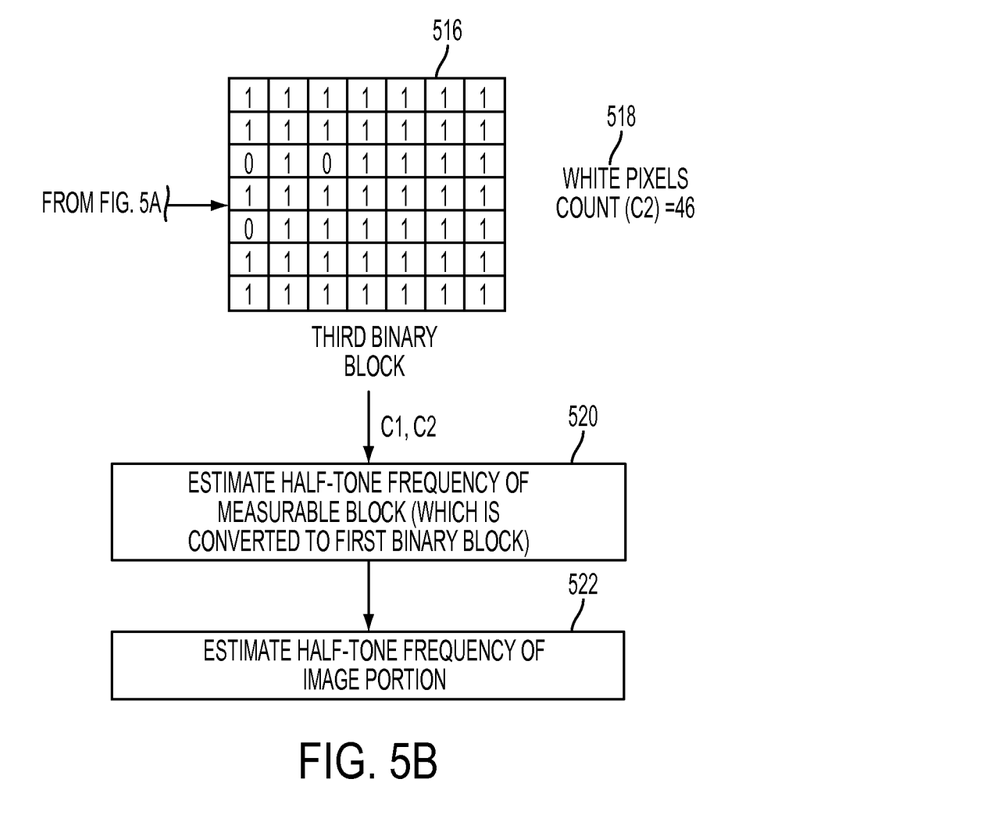

FIGS. 5A and 5B illustrate a flow diagram 500 of a method for processing the image to determine the half-tone frequency of the portion of the image, in accordance with at least one embodiment.

As shown in FIG. 5A, the processor 202 may obtain the first binary block (denoted by 502) from the portion of the image. In an embodiment, the first binary block 502 may be obtained by performing steps 302 to 312 (as explained in conjunction with FIG. 3). For instance, the first binary block 502 is a 7×7 binary block. As shown in FIG. 5A, the count of white pixels (or binary 1's) in the first binary block 502 is 18 (i.e., C1, depicted by 504). The processor 202 may perform the one or more shifting operations on the first binary block 502 to obtain the one or more second binary blocks, denoted collectively by 514 (as explained in step 314). As shown in FIG. 5A, the one or more second binary blocks 514 include a left shifted binary block 506, a right shifted binary block 508, a top shifted binary block 510, and a bottom shifted binary block 512. For instance, the processor 202 generates the left shifted binary block 506 by performing a left shift operation on the first binary block 502 by one bit. The rightmost (highlighted) column in the left shifted binary block 506 is filled with binary values of '0'. However, a person skilled in the art would appreciate that the rightmost column may instead be filled with binary values of '1' without departing from the scope of the disclosure. Similarly, the processor 202 generates the right shifted binary block 508 by right shifting the bits in the first binary block 502 by one place each. The top shifted binary block 510 is generated by top shifting the first binary block 502 by one bit, while the bottom shifted binary block 512 is generated by bottom shifting the first binary block 502 by one bit.

A person skilled in the art would appreciate that the first binary block 502 may be shifted by any number of bits to generate the one or more second binary blocks 514 without departing from the scope of the disclosure. Further, the left shifted binary block 506, the right shifted binary block 508, the top shifted binary block 510, and the bottom shifted binary block 512 are provided as examples of the one or more second binary blocks 514 for illustrative purposes. The one or more second binary blocks 514 may include all or one or more of such binary blocks (506, 508, 510, 512), or any other binary block(s) obtained by performing one or more shifting operations (or any other logical operations) on the first binary block 502.

Further, as shown in FIGS. 5A and 5B, the processor 202 may combine the first binary block 502 with the one or more second binary blocks 514 to generate the third binary block (depicted by 516), in a manner similar to that explained in step 316. For instance, the processor 202 may perform a logical OR operation to combine the values of the pixels in the first binary block 502 and the one or more second binary blocks 514 (which include the left shifted binary block 506, the right shifted binary block 508, the top shifted binary block 510, and the bottom shifted binary block 512). The dimension of the third binary block 516 is same as that of the first binary block 502. For instance, similar to the first binary block 502, the dimension of the third binary block 516 is also 7×7. As shown in FIG. 5, the count of white pixels (or binary 1's) in the third binary block (depicted by 516) is 46 (i.e., C2, depicted by 518).

A person skilled in the art would appreciate that any logical operation such as AND, OR, NOR, XOR, etc. may be performed to combine the first binary block 502 with the one or more second binary blocks 514 to generate the third binary block 516, without departing from the scope of the disclosure.

Thereafter, the processor 202 estimates the half-tone frequency of the measurable block which was converted to the first binary block 502 (depicted by 520), as explained in step 318. For instance, the processor 202 determines a ratio R of C2 and C1 as 46/18, i.e., 2.55. The processor 202 may refer the lookup table to estimate the half-tone frequency of the measurable block. For instance, the processor 202 may determine the half-tone frequency of the measurable block which was converted to the first binary block 502 as 133 LPI in gray scale or 175 LPI in color, depending on whether the image is a gray scale or a color image, respectively (considering the lookup table as illustrated in Table 2).

Thereafter, the processor 202 estimates the half-tone frequency of the portion of the image (depicted by 522). In an embodiment, the processor 202 may estimate the half-tone frequency of the portion of the image based on the half-tone frequency determined for a pre-determined number of measurable blocks having a same value. In another embodiment, the processor 202 may estimate the half-tone frequency of the portion of the image based on an average of the half-tone frequency estimated for a pre-determined number of measurable blocks in the portion of the image. The estimation of the half-tone frequency of the portion of the image based on an half-tone frequency estimated for the measurable blocks in the portion of the image has been further explained in step 320 (in conjunction with FIG. 3).

The disclosed embodiments encompass numerous advantages. The disclosure provides for an estimation of a half-tone frequency of a portion of the image in a spatial (or time) domain. Thus, the image need not be converted into a frequency domain for half-tone frequency estimation, thereby saving computational resources. Further, most of the image processing operations involved in the disclosure are performed on binary blocks, leading to a lower computational complexity than a pixel based estimation method. For instance, as discussed above, a measurable block is converted into the first binary block. Thereafter, one or more shifting operations are performed on the first binary block to generate the one or more second binary blocks, and so on. Such operations are less complex than operations on blocks with multi-bit pixel values.

Further, each block in the portion of the image is analyzed against a measurability criteria. Only the block that satisfies the measurability criteria is selected for estimation of half-tone frequency of the portion. In this way, the measurability criteria filters out blocks on the basis of the constituent pixels of each block being within one or more predetermined threshold pixel values such as H, L, and R (corresponding to the average maximum pixel value, the average minimum pixel value, and the range of pixel values). Thus, such filtering of blocks may lead to a removal of image regions corresponding to un-even transitions (i.e., edges/contours) and extreme pixel values (i.e., black/white noise), and may enhance the accuracy of estimation of half-tone frequency of the region of interest bounded within the portion of image.

Moreover, the disclosure provides a parallelizable method of estimation of the half-tone frequency. The process of evaluation of measurability criteria may be applied on a first set of blocks belonging to a first image portion by a first processor, while the process of estimation of the half-tone frequency of a second set of blocks belonging to a second image portion may be performed by a second processor. Such parallel processing may lead to a reduction of processing time while processing the image for determination of half-tone frequencies.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for estimating a half-tone frequency of an image have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for estimating a half-tone frequency of an image, the method comprising:
   combining, by one or more processors, a first binary block, obtained from a portion of said image, with one or more second binary blocks to create a third binary block, wherein each of said one or more second binary blocks is obtained by shifting said first binary block; and
   estimating, by said one or more processors, said half-tone frequency of said portion of said image, based on said first binary block and said third binary block.

2. The method of claim 1 further comprising segregating, by said one or more processors, said portion of said image in a set of blocks, wherein each block in said set of blocks is segregated in a set of sub-blocks.

3. The method of claim 2 further comprising identifying, by said one or more processors, a measurable block from said set of blocks, wherein said identification comprises:
   determining, by said one or more processors, an average pixel value of each sub-block in set of sub-blocks based on pixel values of each of one or more pixels encompassed by said each sub-block;
   determining, by said one or more processors, a maximum average pixel value among said set of sub-blocks, a minimum average pixel value among said set of sub-blocks, and a range of average pixel values among said set of sub-blocks, based on said average pixel value for said each sub-block;
   comparing, by a comparator, said maximum average pixel value, said minimum average pixel value, and said range of average pixel values with respective pre-determined thresholds; and
   identifying, by said one or more processors, said each block as said measurable block based on said comparison.

4. The method of claim 3 further comprising converting, by said one or more processors, said measurable block to said first binary block by utilizing a thresholding technique.

5. The method of claim 4, wherein a half-tone frequency of said measurable block is estimated based on a count of white pixels in said first binary block and a count of white pixels in said third binary block.

6. The method of claim 5, wherein said half-tone frequency of said portion of said image is estimated based on said half-tone frequency determined for a pre-determined number of measurable blocks having a same value.

7. The method of claim 5, wherein said half-tone frequency of said portion of said image is estimated based on an average of said half-tone frequency estimated for a pre-determined number of measurable blocks, in said portion of said image.

8. The method of claim 1, wherein said shifting corresponds to performing at least one of a left shift operation, a right shift operation, a top shift operation, or a bottom shift operation.

9. A system for estimating a half-tone frequency of an image, the system comprising:
   a computing device comprising one or more processors configured to:
   combine a first binary block, obtained from a portion of said image, with one or more second binary blocks to create a third binary block, wherein each of said one or more second binary blocks is obtained by shifting said first binary block; and
   estimate said half-tone frequency of said portion of said image, based on said first binary block and said third binary block.

10. The system of claim 9, wherein said one or more processors are further configured to segregate said portion of said image in a set of blocks, wherein each block in said set of blocks is segregated in a set of sub-blocks.

11. The system of claim 10, wherein said one or more processors are further configured to identify a measurable block from said set of blocks, wherein said identification comprises:
   determine an average pixel value of each sub-block in set of sub-blocks based on pixel values of each of one or more pixels encompassed by said each sub-block;
   determine a maximum average pixel value among said set of sub-blocks, a minimum average pixel value among said set of sub-blocks, and a range of average pixel values among said set of sub-blocks, based on said average pixel value for said each sub-block;
   compare said maximum average pixel value, said minimum average pixel value, and said range of average pixel values with respective pre-determined thresholds; and
   identify said each block as said measurable block based on said comparison.

12. The system of claim 11, wherein said one or more processors are further configured to convert said measurable block to said first binary block by utilizing a thresholding technique.

13. The system of claim 12, wherein a half-tone frequency of said measurable block is estimated based on a count of white pixels in said first binary block and a count of white pixels in said third binary block.

14. The system of claim 13, wherein said half-tone frequency of said portion of said image is estimated based on said half-tone frequency determined for a pre-determined number of measurable blocks having a same value.

15. The system of claim 13, wherein said half-tone frequency of said portion of said image is estimated based on an average of said half-tone frequency estimated for a pre-determined number of measurable blocks, in said portion of said image.

16. The system of claim 9, wherein said shifting corresponds to performing at least one of a left shift operation, a right shift operation, a top shift operation, or a bottom shift operation.

17. The system of claim 9, wherein said computing device corresponds to at least one of a printer, a scanner, a Multi- Functional Device (MFD), a personal computer, a portable computer, a mobile device, a tablet computer, or a smartphone.

18. A computer program product for use with a computing device, the computer program product comprising a non-transitory computer readable medium, wherein the non-transitory computer readable medium stores a computer program code for estimating a half-tone frequency of an image, wherein the computer program code is executable by one or more processors in the computing device to:
- combine a first binary block, obtained from a portion of said image, with one or more second binary blocks to create a third binary block, wherein each of said one or more second binary blocks is obtained by shifting said first binary block; and
- estimate said half-tone frequency of said portion of said image, based on said first binary block and said third binary block.

19. The computer program product of claim 18, wherein said computer program code is further executable by said one or more processors to segregate said portion of said image in a set of blocks, wherein each block in said set of blocks is segregated in a set of sub-blocks.

20. The computer program product of claim 19, wherein said computer program code is further executable by said one or more processors to identify a measurable block from said set of blocks, wherein said identification comprises:
- determine an average pixel value of each sub-block in set of sub-blocks based on pixel values of each of one or more pixels encompassed by said each sub-block;
- determine a maximum average pixel value among said set of sub-blocks, a minimum average pixel value among said set of sub-blocks, and a range of average pixel values among said set of sub-blocks, based on said average pixel value for said each sub-block;
- compare said maximum average pixel value, said minimum average pixel value, and said range of average pixel values with respective pre-determined thresholds; and
- identify said each block as said measurable block based on said comparison, wherein said measurable block corresponds to said first binary block.

* * * * *